United States Patent [19]

Schneider et al.

[11] 4,067,423
[45] Jan. 10, 1978

[54] CONTROL SYSTEM FOR ROTARY DRILL

[75] Inventors: Raymond C. Schneider; Clairdel C. Cox, both of Rockford, Ill.

[73] Assignee: Twin Disc, Incorporated, Racine, Wis.

[21] Appl. No.: 707,632

[22] Filed: July 22, 1976

[51] Int. Cl.² ..................... G05G 5/10; F16H 57/06; F16D 25/10
[52] U.S. Cl. .................. 192/3.63; 74/476; 74/477; 74/483 K; 74/878
[58] Field of Search ............... 192/3.63; 74/476, 477, 74/483 R, 483 K, 878

[56] References Cited

U.S. PATENT DOCUMENTS

| | | | |
|---|---|---|---|
| 1,850,302 | 3/1932 | Hoelscher | 74/483 X |
| 2,153,085 | 4/1939 | Herndon | 74/477 |
| 2,317,761 | 4/1943 | Haigh | 74/477 |
| 2,537,409 | 1/1951 | Hassman et al. | 192/3.63 |
| 2,798,468 | 7/1957 | Heidner | 74/483 K |
| 3,352,392 | 11/1967 | Black et al. | 192/3.63 X |
| 3,894,443 | 7/1975 | Beig et al. | 74/476 |

*Primary Examiner*—Allan D. Herrmann
*Attorney, Agent, or Firm*—James E. Nilles

[57] ABSTRACT

A mobile rig for drilling blast holes comprises a rotatable drill holder mounted on an upright mast. A torque converter and transmission are connected between a prime mover (I.C. engine or electric motor) on the rig and the drill holder. The torque converter includes a servo controlled modulatable torque converter input (slipping) clutch for driving the drill holder at desired rotational speeds. The transmission includes a pair of solenoid actuated directional clutches selectively energized for driving the drill holder in either forward or reverse directions (threading). A control system, which includes an improved manually operable electromechanical drill control unit having mechanically interlocked separate control knobs for direction (threading) and speed control, is provided to sequence the clutches so as to enable drill holder rotation in either forward or reverse direction from neutral; to enable forward drill holder rotation at any selected speed within a predetermined speed range; to effect reverse drill holder rotation at a predetermined minimum speed; to maintain the selected or predetermined drill speed constant by automatically matching torque to load; to correctly engage the proper directional clutch before the torque converter input clutch begins to engage to thereby smooth out starting of drill holder rotation; and to permit operator manipulation of the direction and speed control knobs only in a predetermined sequence to thereby prevent damage to the drill and drill rig.

11 Claims, 12 Drawing Figures

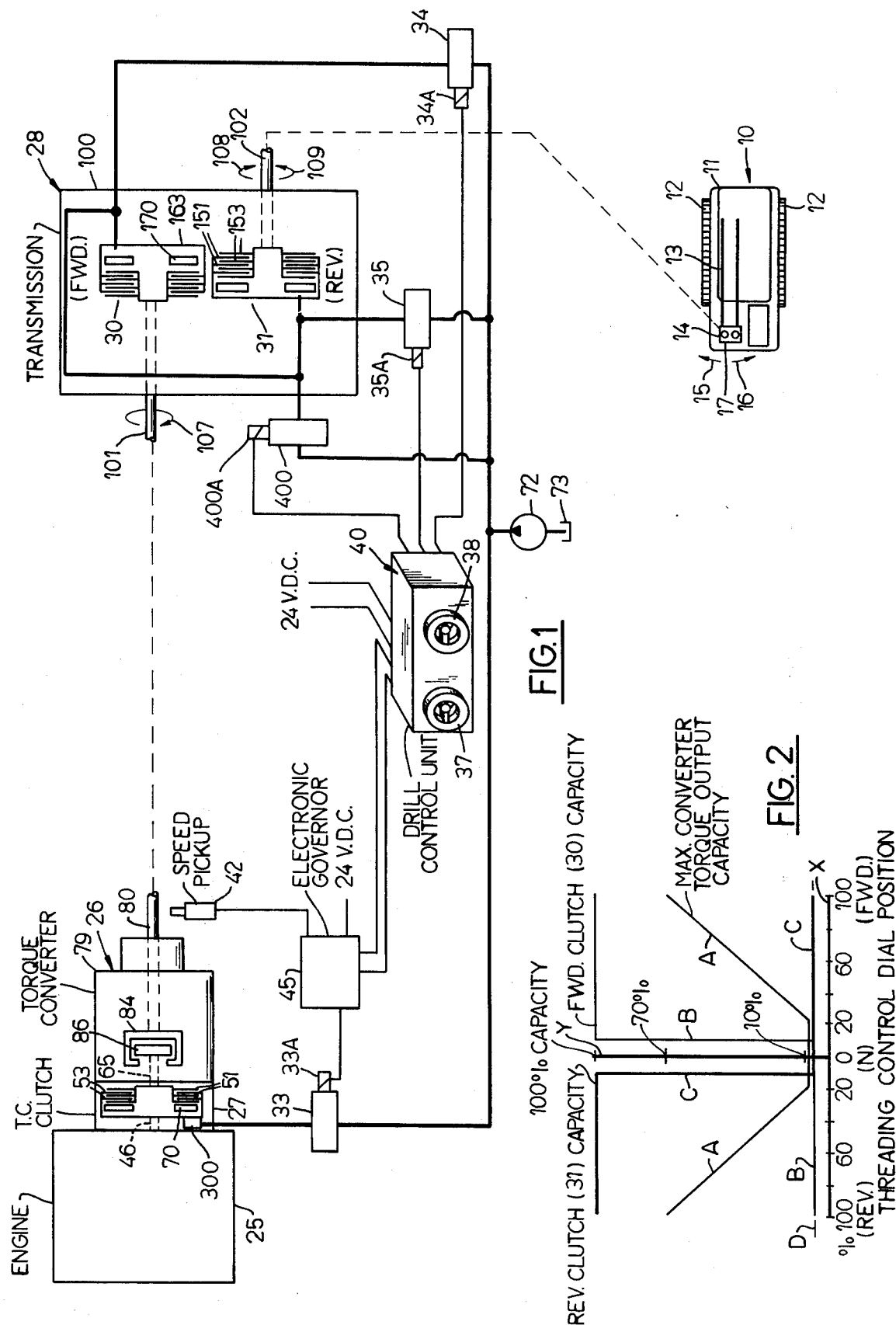

THREADING
CONTROL DIAL
(DIRECTION)

DRILL SPEED
CONTROL DIAL
(RPM- SPEED)

CONTROL SYSTEM FOR ROTARY DRILL

BACKGROUND OF THE INVENTION

1. Field of Use

This invention relates generally to a blast hole drilling rig and especially to a control system for a modulatable power transmission system which drives the rotary drill holder thereof. In particular, it relates to such a control system which includes an improved manually operable electromechanical drill control unit having mechanically interlocked separate control knobs for direction (threading mode) and speed control (drilling mode) of the drill holder which ensures manipulation of the control knobs in a predetermined sequence.

2. Description of the Prior Art

In prior art drilling rigs, the drill holder is driven by a prime mover through a conventional power transmission system using non-modulatable friction type clutches. As a result, it is difficult to obtain smooth starting and stopping of the drill holder and the drill sometimes breaks. Furthermore, prior art control systems are not designed to guard against improper or injudicious use of the manually operable direction selection and speed regulation controls and, as a result, drills are more easily broken and other damage to the rig sometimes results.

SUMMARY OF THE INVENTION

In accordance with the invention, there is provided a mobile drilling rig for drilling blast holes which comprises a rotatable drill holder mounted on an upright mast. A torgue converter and transmission are connected between a prime mover (I.C. engine or electric motor) on the rig and the drill holder. The torgue converter, connected between the engine and transission, includes a servo conrolled modulatable torgue coverter input clutch for driving the drill holder at desired rotational speeds during drilling. The transmission, connected between the torgue converter and drill holder, includes a pair of solenoid operated directional clutches selectively operable for driving the drill holder in either forward or reverse directions (threading). The torque converter clutch is modulatable between disengaged and engaged positions. Each transmission clutch is actuated between a minimum engaged position (bias torgue capacity) and a fully engaged position (maximum torque capacity). A control system, which includes an improved manually operable electromechanical drill control unit having mechanically interlocked separate control knobs for direction (threading) and speed control (drilling), is provided to operate the clutches so as to enable drill holder rotation in either forward or reverse direction from neutral; to enable forward drill holder rotation at any selected speed within a predetermined speed range (i.e., 30 rpm to 200 rpm); to effect reverse drill holder rotation at a predetermined minimum speed (i.e., 30 rpm); to maintain the selected or predetermined drill speed constant by means of an electronic governor which senses torque converter output speed (transmission input speed) and matches torque to load; to correctly actuate either clutch so that the selected directional clutch before and disengages after the torque converter clutch to thereby smooth out starting and stopping of drill holder rotation; and to permit operator manipulation of the direction and speed control knobs only in a predetermined sequence to thereby prevent damage to the drill, the drill rig, and the power transmission apparatus.

The drill control unit comprises two manually operable shaft-mounted rotatable dials, one for threading control (neutral, forward, reverse) and the other for drill speed control (minimum to maximum speed). The dial shafts operate rheostats and electrical switches and are mechanically interlocked so that only one dial is operable at any given time. Transfer of control from one dial to the other necessitates that both dials be in an interlock zone. When either dial is moved out of the interlock zone, it mechanically locks the other dial in its interlock position. In particular: when the threading control dial is in neutral, the speed control dial connot be rotated to change speed; when the threading control dial is in its maximum forward position, the speed control dial can be adjusted or changed; when the threading control dial is in reverse position, the speed control dial cannot be adjusted; and, the threading control dial cannot be moved to or from any position unless the speed control dial is in minimum position.

BRIEF DESCRIPTION OF THE DRAWINGS

FIG. 1 is a schematic diagram of a power transmission system for the drill holder of a drill rig in accordance with the present invention, and shows a prime mover, a torque converter having a modulatable torque converter input clutch, a transmission having partially engaged (biased), right and left independently operable (by solenoid valves) transmission clutches, an electrohydraulic servo control valve for the torque converter input clutch, a manually operable electric control unit for the control valves, and a governor for speed control of the torque converter output; FIG. 2 is a graph depicting the relationship between movement of the operator's threading control and torque conditions in both the torque coverter clutch and that transmission clutch which is selected for operation;

DESCRIPTION OF A PREFERRED EMBODIMENT

General Arrangement

Figure 4:
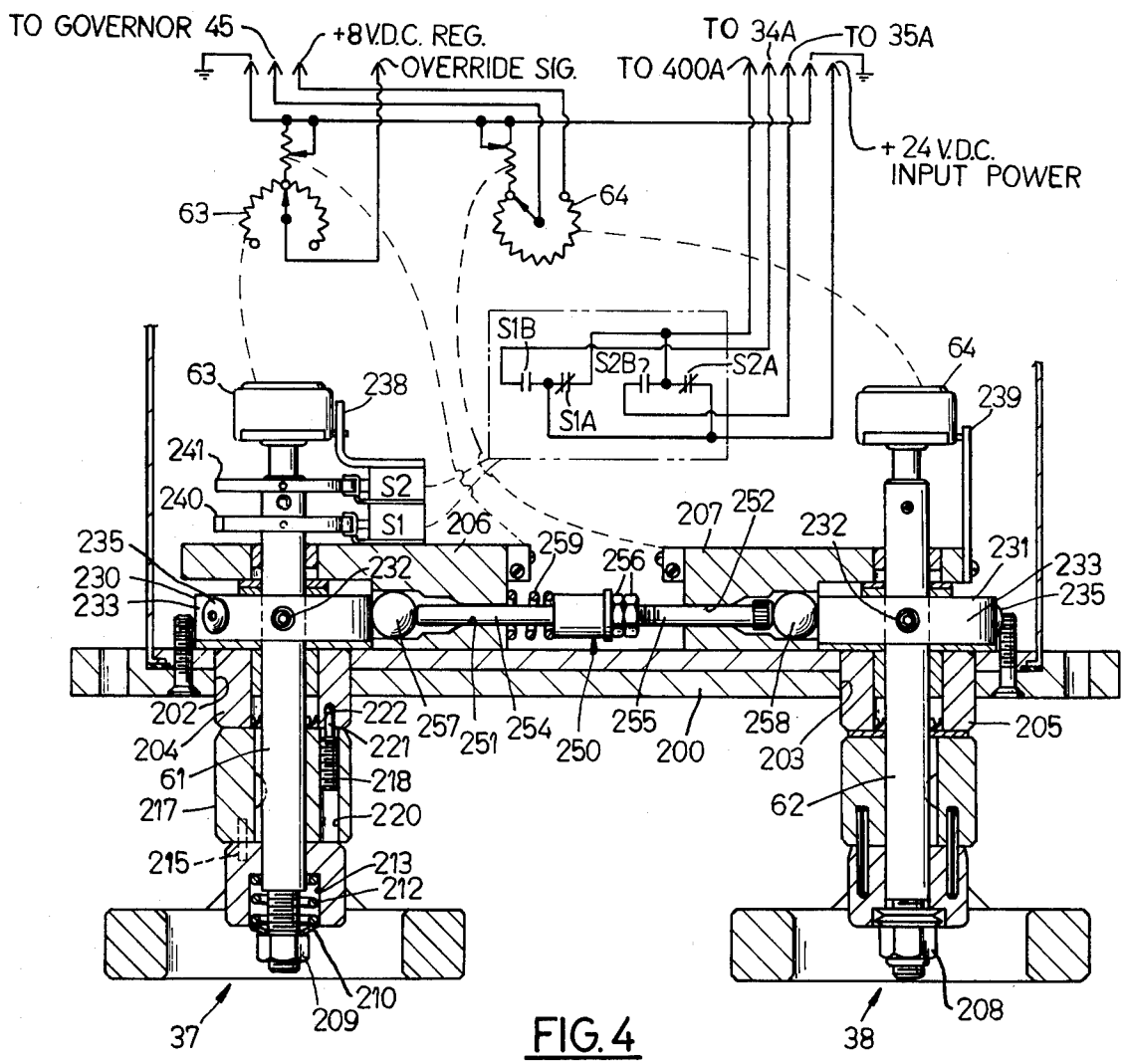
FIG. 4 is a view partly in cross section and partly schematic of the control unit shown in FIG. 3.

Referring to FIG. 1, there is provided a mobile ring 10 for drilling blast holes which comprises a rotatable drill holder 17 mounted on an upright mast 14. A torque converter 26 and transmission 28 are connected between a prime mover (I.C. engine or electric motor) 25 on the rig 10 and the drill holder 17. The torque converter 26, connected between the engine 25 and transmission 28, includes an electrohydraulic servo controlled modulatable torque converter clutch 27 for driving the drill holder 17 at desired rotational speeds. The transmission 28, connected between the torque converter 26 and drill holder 17, includes a pair of solenoid operated directional clutches 30 and 31 selectively operable for driving the drill holder 17 in either forward or reverse directions (threading), respectively. The torque converter clutch 27 in modulatable between a minimum engaged position and a fuly engaged position. A control system, which includes an improved manually operable electromechanical drill control unit 40 having mechanically interlocked separate control knobs 37 and 38 for direction (threading) control and speed (drilling) control, respectively, is provided to operate the clutches 27, 30, and 31 so as to enable drill holder rotation in either forward or reverse direction from neutral; to enable forward drill holder rotation at any selected speed within a predetermined speed range (i.e., 30 rpm to 200 rpm); to effect reverse drill holder rotation at a predetermined minimum speed (i.e., 30 rpm); to maintain the selected or predetermined drill speed constant by means of a governor 45 which senses torque converter output speed (transmission input speed) and matches torque to load; to automatically engage the clutches 30 and 31 so that the selected directional clutch 30 or 31 engages before and disengages after the torque converter clutch 27 to thereby smooth out starting and stopping of drill holder rotation; and to permit operator manipulation of the direction and speed control knobs 37 and 38 only in a predetermined sequence to thereby prevent damage to the drill and drill rig.

Figure 3:
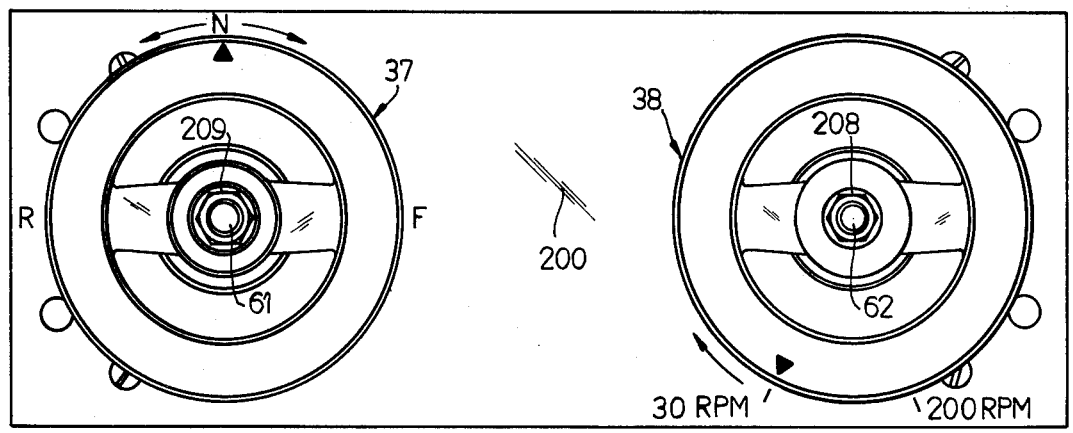
FIG. 3 is an enlarged front elevation view of the drill control unit shown in FIG. 1.
Figure 5:
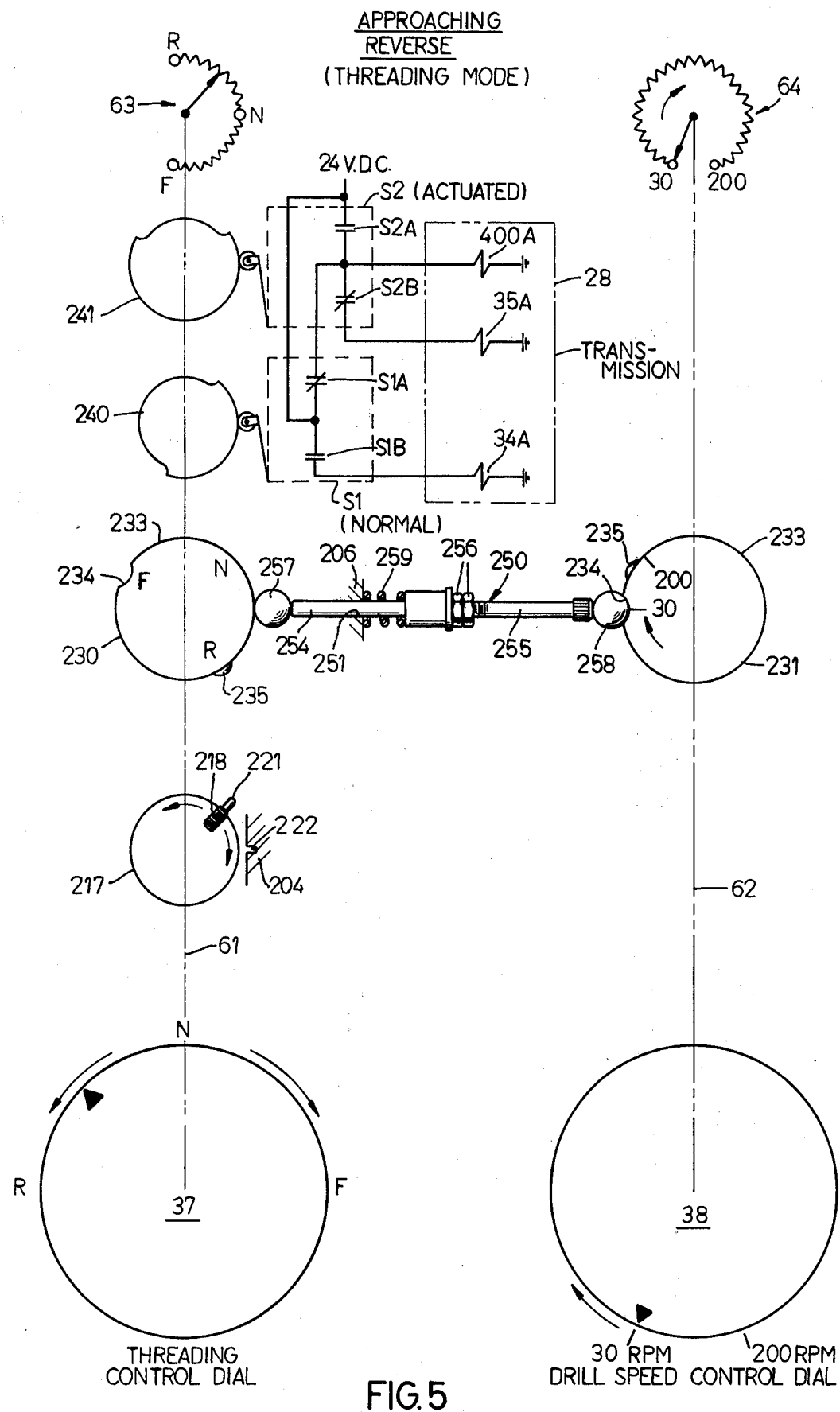
FIG. 5 is a schematic diagram of the control unit of FIGS. 4 and 5 showing the position of the components thereof when the control unit is in reverse.
Figure 6:
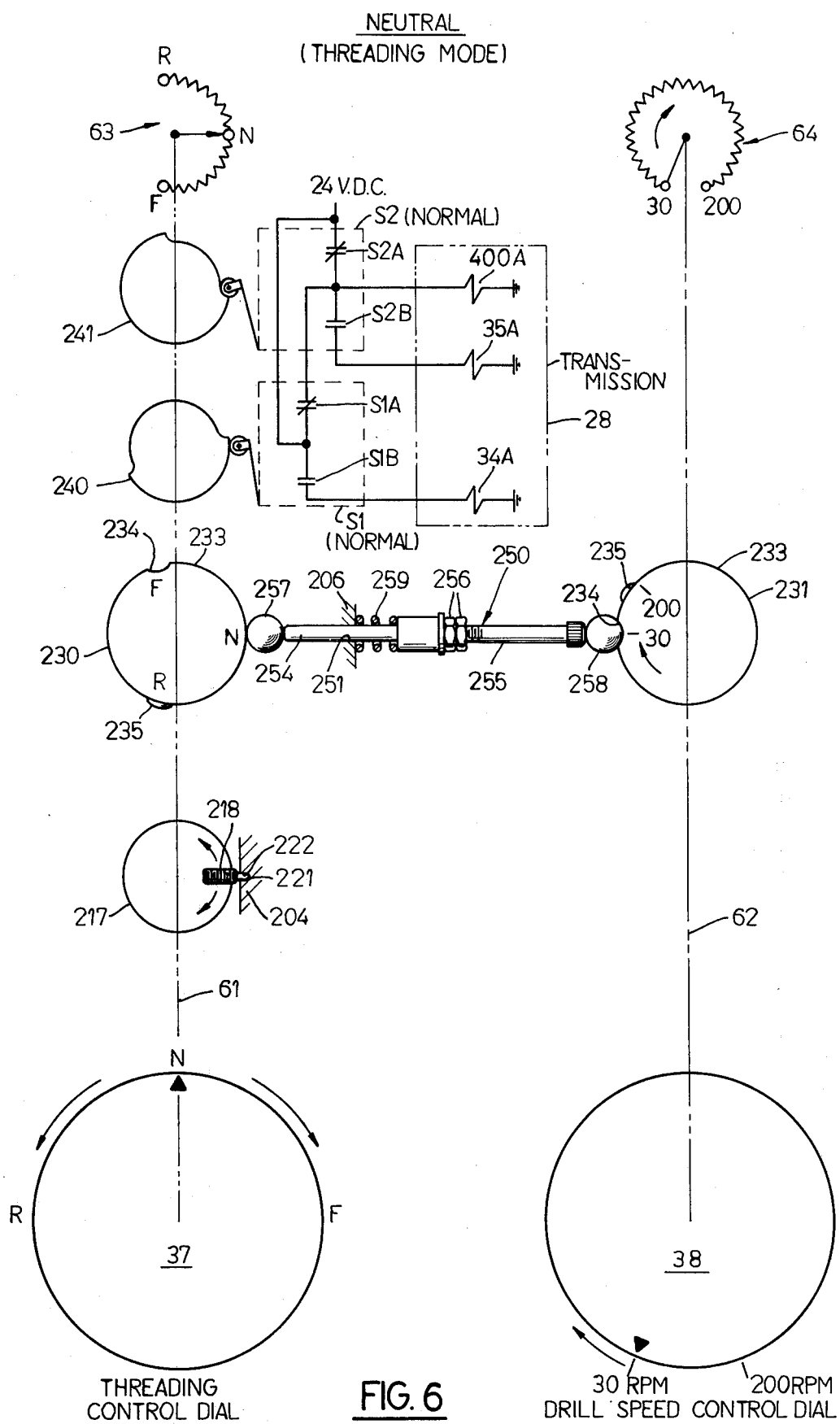
FIG. 6 is a view similar to FIG. 5 but showing the components in neutral.
Figure 8:
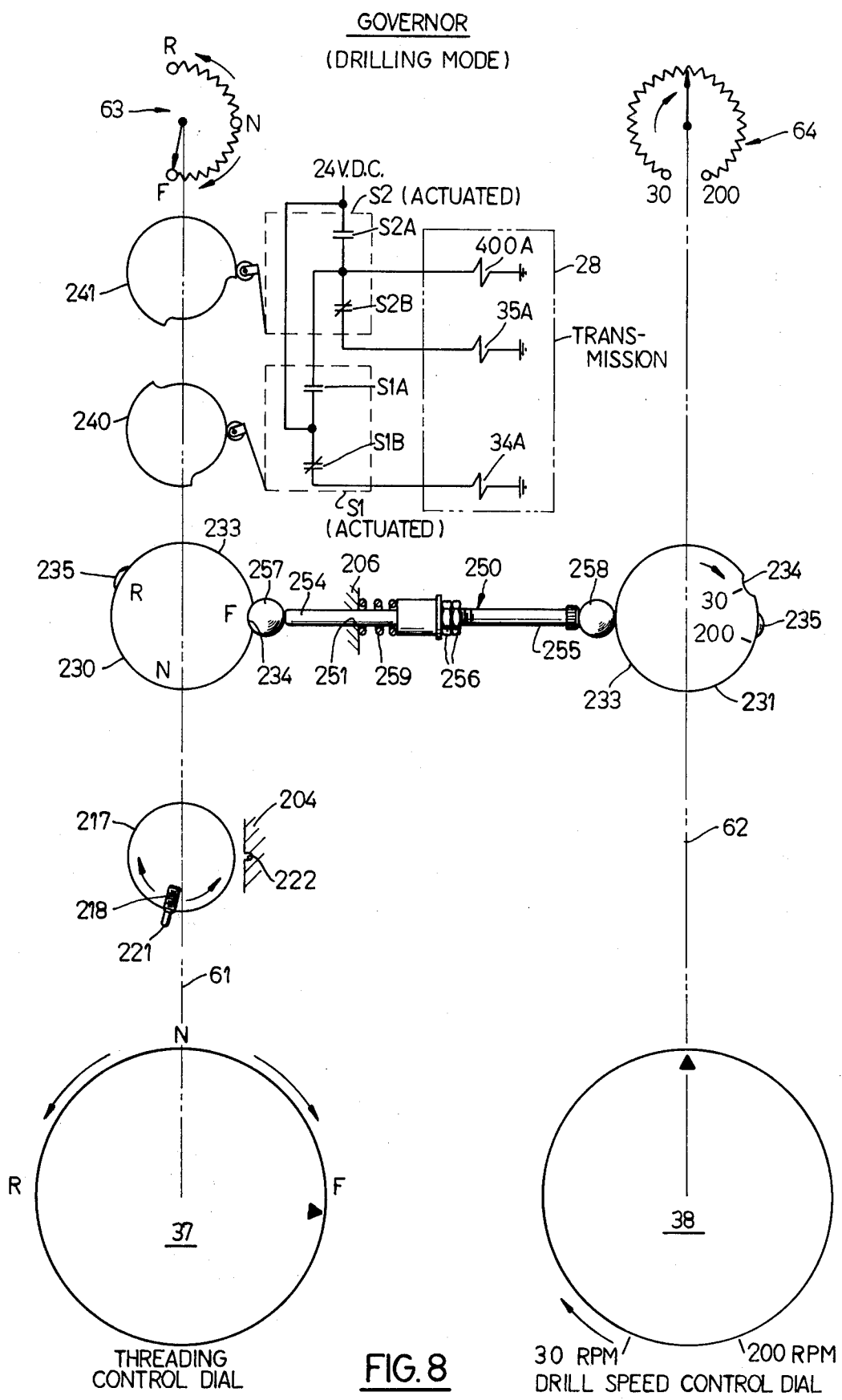
FIG. 8 is a view similar to FIG. 5 but showing the components in the maximum forward position wherein the bias is removed from the reverse clutch, thereby reducing drag in the reverse clutch and allowing higher speed operation.

The drill control unit 40 shown in FIGS. 3 and 4 comprises two manually operable rotatable knobs or dials 37 and 38 mounted on shafts 61 and 62, respectively, one for threading control (neutral, forward, reverse) and the other for drill speed control. The dial shafts 61 and 62 operate rheostats or potentiometers 63 and 64, respectively, and shaft 61 also operates electrical switches S1 and S2. The shafts 61 and 62 are mechanically interlocked, as hereinafter explained, so that only one dial 37 or 38 is operable at any given time. Transfer of control from one dial 37, 38 to the other necessitates that both dials be in an interlock zone. When either dial 37, 38 is moved out of the interlock zone, it mechanically locks the other dial in its interlock position. In particular: as FIG. 6 shows, when the threading control dial 37 is in neutral, the speed control dial 38 cannot be rotated to change speed; as FIG. 8 shows, when the threading cosntrol dial 37 is in its maximum forward position, the speed control dial 38 can be adjusted or changed; as FIG. 5 shows, when the threading control dial 37 is in reverse position, the speed control dial 38 cannot be adjusted; and, the threading control dial cannot be moved to or from any position unless the speed control dial is in minimum position.

DETAILED DESCRIPTION OF THE SYSTEM

Referring to FIG. 1, rotary drill rig 10 (shown in a schematic top plan view) has a lower section 11, including crawler tracks 12, and an upper section 13, including an upright mast 14. Mast 14 carries a drill holder 17 which is adapted to be rotated in a horizontal plane either to the right (forward) or to the left (reverse) in the direction of the arrows 15 and 16, respectively.

FIG. 1 further shows a power transmission system in accordance with the invention for driving the drill holder 17 in the desired direction at an appropriate speed. Generally considered, the power transmission system comprises a prime mover or engine 25, a torque converter 26, a modulatable torque converter clutch 27 connected between engine 25 and torque converter 26, and a transmission 28 including a forward transmission clutch 30 and a reverse transmission clutch 31. The torque converter clutch 27 is modulated by a servo valve assembly 33A, 33; each of the clutches 30 and 31 are actuated by means of their own separate electric solenoid operated control valves 34 and 35, respectively. The three control valves 33, 34, 35 are controlled in response to an operator's control unit 40 which is selectively operable to effect rotation of drill holder 17 from neutral to forward or reverse and at an appropriate speed. Control unit 40 provides an electric control signal to the torque converter clutch control servo valve 33 and to either one or the other of the transmission clutch control valves 34 or 35. The forward and reverse transmission clutches 30 and 31 are contructed so that each is biased (by activating solenoid valve 400, 400A) into minimum engaged position, even when solenoids 34A and 35A are not actuated, so that further engagement of either of these transmission clutches 30 and 31 is not accompanied by excessive shock or vibration, and so that the non-selected transmission clutch 30 or 31 exerts a slight drag as the drill holder is rotated, thereby providing for better control. The control unit 40 is constructed so that modulation of the torque converter clutch 27 is carried out after selected transmission clutch 30 or 31, thereby ensuring that the selected transmission clutch 30 or 31 is fully engaged before the torque converter clutch 27 begins to be engaged. The control system is further provided with means including a speed pickup or sensor 42 for sensing the output speed of output shaft 80 of the torque converter 26 (the input speed of input shaft 101 of the transmission 28) and a governor 45 for receiving the speed signal from pickup 42 and for governing operation of the control valve 33 for the torque converter clutch 27 in accordance with speed.

Referring to FIG. 2, the graph therein depicts the relationship between the mode of operation of the operator's control unit 40 and torque conditions at the torque converter turbine 84, and whichever one of the transmission clutches 30 or 31 is selected for operation. In the graph, the axis X is calibrated in the percentage of movement of dial 37 between 0% (neutral) position and 100% in either forward or reverse direction. The axis Y is calibrated in percentage of maximum clutch capacity of clutches 30 and 31. The curve designated A indicates torque at the converter output shaft 80 due to conditions within the torque converter clutch 27 and the curves designated B and C indicate the torque conditions within the selected one of the transmission clutches 30 and 31, respectively.

In the following description, each of the components or elements in the power transmission system shown in FIG. 1 is briefly described. However, for a detailed description of the components reference may be had to pending U.S. Pat. application Ser. No. 643,357, filed Dec. 22, 1975 by Schneider and Pelligrino entitled "Swing Control for Crane" and assigned to the same assignee as the present application. It is to be understood that the solenoid operated transmission clutch control valves 34 and 35 are identical to each other in construction and mode of operation and are described in the above-mentioned application. Therefore, only the torque converter clutch control valve 33 will be described. Furthermore, since the forward and reverse transmission clutches 30 and 31 are identical, only the forward clutch 30 will be described in detail.

The Torque Converter Clutch

Referring to FIG. 1, the engine 25 comprises a drive shaft 46 which, for example, normally rotates at a constant speed of 2000 rpm when the engine is running. Engine drive shaft 46 ultimately drives the drive plates 51 which, along with driven plates 53, are part of torque converter clutch 27.

The clutch 27 is constructed so that it has a minimum disengaged position and can be modulated to a fully engaged position or to any partially engaged position. Clutch 27 is hydraulically applied and spring-released and is controlled or modulated by the servo operated torque converter clutch control valve 33, hereinafter described. As FIG. 1 shows, the shaft 65 serves as the output shaft for torque converter clutch 27 and as the input shaft for the torque converter 26.

Means are provided in clutch 27 to selectively force the drive plates 51 and the driven plates 53 into face-to-face engagement so that power may be transmitted from the drive plates 51 to the driven plates 53 and thereby effect rotation of the driven plates 53 and the shaft 65. It is to be understood that torque converter clutch 27 is a fully modulatable clutch and that the amount of power transmitted from the drive plates 51 to the driven plates 53 is proportional to the amount of pressure applied to force the plates together. The means in clutch 27 for forcing the drive plates 51 and driven plates 53 together comprise piston 70. The piston 70 is movable from a spring biased clutch disengaged position to any partially engaged or to a fully engaged position (not shown) by means of hydraulic fluid or oil which is supplied through valve 33 from a source of pressurized fluid, such as a pump 72 and reservoir 73 shown in FIG. 1.

The torque transmitting ability of a friction clutch such as 27 will tend to vary considerably when in use, and this variation is due to several things, one of which is the fact that the coefficient of friction in any given clutch changes rapidly during its use. Because of this, the control of clutch 27 would be very difficult, particularly since clutch 27 is used to feed into torque converter 26, and this would result in considerable instability of the power drive. It is, therefore, desirable to provide a centrifugally operated modulating control valve 300, as shown in FIG. 1, which act as a hydraulic governor for controlling the speed of the input member of the clutch 27, independently of variations in the coefficient of friction in the clutch itself. The valve 300 will then hydraulically control the speed setting and compensate for any changes in plate friction in the clutch. A suitable valve for use as valve 300 is shown and described in detail in U.S. Pat. No. 3,352,395, issued Nov. 14, 1967 to Conrad R. Hilpert for "Friction Clutch Having Centrifugally Operated Valve Means," which patent is assigned to the same assignee as the present application. When the clutch 27 is partially or fully engaged, the shaft 65 rotates and transmits torque to the torque converter 26 in proportion to the extent of modulation or engagement of the torque converter clutch 27.

The Torque Converter

As hereinbefore explained, the output shaft 65 of torque converter clutch 27 also serves as the input shaft 65 for the torque converter 26. Power from shaft 65 is transmitted through torque converter 26 to the output shaft 80 of the torque converter. As FIG. 1 shows, the torque converter 26 comprises a housing 79 within which a rotatable impeller 86 is mounted for driving a rotatable turbine 84 by means of oil flow therbetween. The impeller 86 is spline-connected to shaft 65 and is rotated by input shaft 65. The turbine 84 is spline-connected to turbine output shaft 80 and drives output shaft 80.

Transmission and the Transmission Clutches

As FIG. 1 shows, the transmission 28 comprises a housing 100 in which the transmission clutches 30 and 31 are disposed and into which a transmission input shaft 101 extends and from which a transmission output shaft 102 extends. As FIG. 1 shows, the input shaft 101 is mechanically connected to torque converter output shaft 80 and is driven thereby in the direction of the arrow 107. Whereas, input shaft 101, when driven, always rotates in the direction of arrow 107, the output shaft 102 is adapted to be rotated either in the direction of the arrow 108 (forward) or in the opposite direction as indicated by the arrow 109 (reverse), depending on which clutch 30 or 31 is engaged.

As hereinafter explained, each of the clutches 30 and 31 is constructed so that is is either off at a minimum engaged position, or on at a fully engaged position. It is to be further understood that the clutches 30 and 31 are controlled so that when the control knob 37 is in the neutral position, both clutches are in the minimum engaged (non-actuated) position. However, when control knob 37 is moved from neutral position to either forward or reverse position, then clutch 30 or 31, respectively, will be fully engaged. Referring to FIG. 1, the flow of power through transmission 28 is understood to be as follows, assuming that input shaft 101 is rotating in the direction of arrow 107. Assuming that neither clutch 30 nor 31 is actuated, output shaft 102 is stationary. Assuming that clutch 30 is fully engaged, the power train is as follows: from input shaft 101, through clutch 30, to output shaft 102, which rotates in the direction of arrow 109. Assuming that clutch 31 is fully engaged, the power train is as follows: from input shaft 101, through clutch 31, to output shaft 102, the latter rotating in the direction of arrow 108.

Since the transmission clutches 30 and 31 shown in FIG. 1 are substantially identical in construction, only clutch 30 is hereinafter described in detail. However, it will be noted from FIG. 1 that the clutches 30 and 31 are reversely mounted with respect to each other. As FIG. 1 shows, clutch 30 comprises a set of drive plates 151 and a set of driven plates 153. The driven plates 153 are interposed between the drive plates 151 and are axially slideable so that when the plates 153 are being driven as a result of frictional engagement with the drive plates 151, the shaft 102 rotates.

Means are provided in clutch 30 to force the drive plates 151 and the driven plates 153 into face-to-face engagement so that torque may be transmitted from the drive plates 151 to the driven plates 153 and thereby effect rotation of the driven plates 153 and the shaft 102. Clutch 30 is either "on" or 37 off" and the amount of torque transmitted from the drive plates 151 to the driven plates 153 is proportional to the amount of pressure applied to force the plates together. The means in clutch 30 for forcing the drive plates 151 and driven plates 153 together comprise a cylinder 163 having a piston 170. The piston 170 is moved from a minimum engaged (non-actuated) position (not shown) by means of hydraulic fluid or oil which is supplied through valve 34 from a source of pressurized fluid, such as pump 72 and reservoir 73 shown in FIG. 1. This minimum engaged (non-actuated) position of piston 170 is alterable by the condition of solenoid actuated valve 400. If solenoid valve 400 is actuated, the minimum clutch 30 engagement is at the bias level D of torque capacity shown on FIG. 2. If solenoid valve 400 is non-actuated, the minimum capacity is reduced to fully disengaged zero capacity. Thus, the bias capacity (minimum drag capacity) is either present or absent depending upon the circumstance of valve 400 being either actuated or non-actuated, respectively. Reference to FIGS. 2 and 8 indicates that the control stem 61 automatically de-activates the bias solenoid valve 400 upon full forward (clockwise rotation) of the threading control knob 37.

As FIG. 1 shows, the transmission clutch 30 is generally similar to the modulatable torque converter clutch 27 in construction.

Electrohydraulic Servo Operated Control Valve

FIG. 1 shows that the control valve 33 controls the supply of hydraulic operating fluid to the clutch 27 from pump 72. Control valve 33 is connectable to pump 72, to the clutch 27 being controlled by the valve, and the sump or reservoir 73. Valve 33 is movable between a minimum or null position wherein it is biased and a fully open position by means of an electrically operated proportional solenoid 33A. As will be understood, the amount of operating fluid metered by valve 33 to operate or modulate its associate clutch, is proportional to the operating current applied to the proportional solenoid 33A. The proportional solenoid 33A may, for example, be operated by means of an electric circuit of the type shown in FIGS. 1 and 4. There is a direct relationship between the amperage applied to the proportional solenoid 33A and the amount of fluid pressure (in pounds per square inch) appearing at its controlled pressure port.

As is clear, both transmission clutches 30, 31 are either "on" or "off" (not modulated) and are controlled by on-off solenoids (not proportional) identified as 34A and 35A. The third similar on-off solenoid valve 400A functions to control the presence or absence of a minimum bias (drag) engagement whereupon electrical energization of 400A does cause to be present a minimum pressure upon the clutch pistons 170 and thereupon effect a minimum clamping force on the clutch elements 151 and 153. The absence of said electrical signal removes the aforementioned bias pressure. Valve 300 is not an electrical valve but an Omega valve which is described in detail in a paper entitled "Omega Drives — A New Converter Concept" which was presented Feb. 27, 1970 by H. J. Wirry in Tulsa, Okla. at a meeting of the Association of Oil Well Servicing Contractors and is available from the assignee of this application.

The Drill Control Unit

As FIGS. 3 and 4 show, drill control unit 40 comprises a supporting housing including a face plate 200 having openings 202 and 203 in which shaft supporting members 204 and 205, respectively, are mounted to provide for rotational support of the control shafts 61 and 62 to which the dials 37 and 38, respectively, are connected. The face plate 200 is provided on the rear side thereof with support members 206 and 207 which are rigidly secured thereto and provide mechanical support for electrical components hereinafter described and for an interlock member hereinafter described. Dial 38 is directly attached to the outer end of shaft 62 by a nut 208 which screws onto the threaded outer end of shaft 62. Dial 37 is secured to shaft 61 in such a manner that the dial 37 is releasably lockable in neutral position. More specifically, dial 37 is secured to the outer end of shaft 61 by a nut 209 which bears against a Belleville lock washer 210 which, in turn, bears against a compression spring 212 disposed within a recess 213 in the hub of dial 37. The hub of dial 37 is rigidly secured, as by a pin 215, to a stem spacer member 217 which has a detent device 218 secured in a hole 220 therein. Detent device 218 includes a spring biased plusnger 221 which is releasably engageable with a detent hole 222 in the support member 204. Thus, when the detent plunger 221 engages the detent hole 222 (i.e., when dial 37 is in neutral position), the dial 37 and its shaft 62 cannot be rotated. However, if dial 37 and shaft 61 are drawn downwardly with respect to FIG. 4 against the bias of spring 212, the detent plunger 221 disengages the detent hole 222 and the dial 37 and shaft 61 can be rotated sufficiently so as to cause the detent plunger 221 to clear the detent hole 222. Thus, if dial 37 and shaft 61 are rotated then from neutral toward forward or reverse positions and the dial 37 is then allowed to return inwardly toward face plate 200 by the biasing action of the spring 212, the detent plunger 221 rides on the face of member 204 and the dial 37 and shaft 61 can be rotated toward forward or reverse positions.

The shafts 61 and 62 are provided with circular interlock discs 230 and 231, respectively. Each interlock disc 230, 231 is provided with a set of screws 232 to secure it in a fixed position on its respective shaft. Each disc is also provided with a peripheral surface 233, with a detent notch 234 in its peripheral surface, and with a projection 235 on its peripheral surface. The inner ends of the shafts 61 and 62 are connected to the rotatable shafts of the potentiometers 63 and 64, respectively, and the housings of the potentiometers are secured to the support members 206 and 207 by brackets 238 and 239, respectively. As FIG. 4 shows, the bracket 238 for potentiometer 63 is also sused to rigidly secure the limit switches S1 and S2 to the member 206. Shaft 61 is also provided with a pair of switch actuating cams 240 and 241 for operating the switches S1 and S2, respectively. As hereinafter explained in detail, when dial 38 and shaft 62 are rotated, the potentiometer 64 is actuated. When dial 37 and shaft 61 are rotated (after the detent plunger 221 is released), the cams 240 and 241 effect operation of the switches S1 and S2, respectively, and the potentiometer 63. Cam 240 is a 180° cam and cam 241 is a 90° cam.

The interlock means comprises an elongated interlock member 250 in the form of a two-piece shaft of adjustable length which is mounted for axial sliding movement in holes or bore 251 and 252 in the members 206 and 207, respectively. The interlock member 250 is constructed in two pieces 254 and 255 which are secured together by a threaded fastener 254 and lock nuts 256 which enable the member 250 to be installed and adjusted to the appropriate length. Ball bearings 257 and 258 serving as detent members are disposed between the ends of the interlock member 250 and the interlock discs 230 and 231, respectively. Member 250 is spring-biased to the right in FIG. 4 by a spring 259.

As FIGS. 3 and 4 show, the left dial 37 is used for threading in either forward or reverse. The right dial 38 sets drill speeds. The threading control dial 37 and drill speed control dial 38 provide for individually controllable functions. These dials 37 and 38 are interlocked mechanically so that only one dial is operable at any one time. Transfer of control from one dial to another necessitates that both dials 37 and 38 are in the "interlock" zones. When either dial 37 or 38 is moved out of the interlock zone, it mechanically locks the opposite dial in its interlock position. All rotary motion is started by having the drill dial 38 in its interlock zone and threading dial 37 in neutral. Notice that to come to rest from drilling, the right dial 38 must be returned to minimum position (full counterclockwise) and the left dial 37 then returned to neutral (detented vertical position). The rotation of drill dial 38 is approximately 320°. The rotation of threading control dial 37 is approximately 90° on each side of neutral. Each dial 37, 38 is friction held and, in addition, when either dial is out of the interlock position, the other dial is mechanically prevented from turning. The two dials 37, 38 enable two distinct modes of governor control. The threading mode uses the electronic governor 45 to limit output speeds (e.g., to 30 rpm); the drilling mode uses the governor 45 to hold selected speeds by automatically matching the torque to the load at the speed selected. FIGS. 9-12 show how the individual control functions are sequenced.

The Governor

Referring to FIG. 1, it is seen that the electric servo operated control valve 33 controls the torque converter clutch 27. From a practical standpoint, it is desirable to limit the speed at which the drill holder 17 can be rotated, regardless of the extend of movement of the operator's dial 38. Accordingly, the operating signal from control unit 40 is furnished to modulating valve 33 through a governor 45 which in turn is responsive to a speed signal from the speed pickup 42 which is responsive to the speed of torque converter output shaft 43. The governor 45 and the speed pickup 42 may take the form of any known type of prior art device. In practice, an electronic governor available from the Barber-Colman Co., 1300 Rock St., Rockford, Ill., and identified as their Part No. DYN1-10005, was found to be suitable.

Governor 45 used was a three term controller incorporating proportional, integral, and derivative corrections into the speed control circuitry. The position of potentiometer 64 electrically defines the governed speed. If the speed sensed by the governor 45 is greater than desired (set by position of potentiometer 64), the output control signal to valve 33 is diminished to correct the speed error. If the speed sensed is less than desired, the output control signal is increased. If the speed sensed is the speed desired, the output control signal is sustained at its then present value of amperage (to valve 33). The signal generated from either last above-described conditions may be overridden by potentiometer 63 and reduced (but not increased) as follows: if potentiometer 63 generates an override signal (see FIG. 4) at or near ground, the governor is overridden and the amperage to 33A is negligible and clutch 27 is at minimum engagement. When the override signal is electrically removed from ground by rotation of potentiometer 63, amperage to 33A is allowed to increase. By sufficient rotation, the amperage is allowed to increase to the level required by the setting of potentiometer 64 whose influence is described above. Control amperage to 33A is seen to be defined by either potentiometer 63 or potentiometer 64 which ever shall imply the least amperage. This follows from the observation that potentiometer 63 can only override by demanding less amperage than that sought by the speed setting, potentiometer 64.

The Control Circuit

FIG. 4 (and FIGS. 5-8) show an elementary electric circuit diagram for controlling the proportional solenoid 33A, and the on-off solenoids 34A and 35A for the clutch control valves 33, 34, and 35, respectively. The electric control circuit comprises a 24 volt d.c. power supply for energizing the control valve solenoids through the switches S1 and S2. Switch S1 includes a normally open contact S1B and a normally closed contact S1A. Switch S2 includes a normally open contact S2A and a normally closed contact S2B. The potentiometer 63 provides a signal for the solenoid 33A for the torque converter clutch valve 33 when the threading control dial 37 is operated. The potentiometer 64 provedes the signal for energizing the proportional solenoid 33A in accordance with the position of the speed control dial 38 when the threading control dial 37 is in the forward position. The electrical control circuit disclosed herein is shown in elementary form but could be used with portions of the electrical control circuit shown in patent application Ser. No. 643,357 hereinbefore referred to.

Referring to FIG. 6, when threading control dial 37 is in neutral position, cam 240 actuates switch S1 so that contact S1A is closed and contact S1B is open. Cam 241 actuates switch S2 so that contact S2A is closed and contact S2B is open. Potentiometer 63 is in its neutral no signal position. As a consequence, solenoids 34A and 35A are de-energized but solenoid 33A for the torque converter clutch establishes a minimum hydraulic bias signal. When dial 37 is in neutral, drill speed control dial 38 must necessarily be in its minimum speed position (30 rpm) as a result of the operation of the interlock member 250. Dial 37 is locked in neutral position by detent plunger 221.

Figure 7:
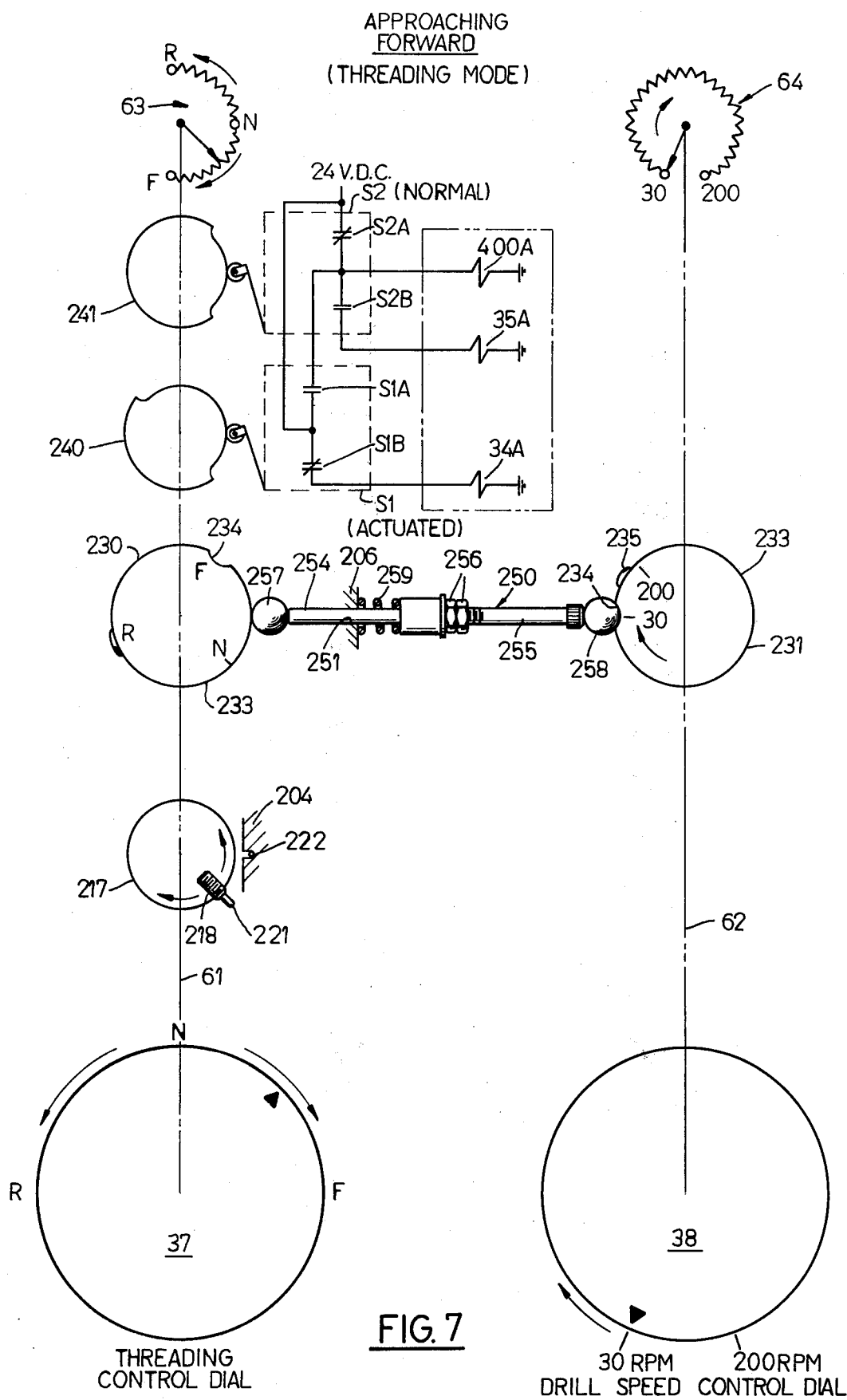
FIG. 7 is a view similar to FIG. 5 but showing the components in forward.

FIG. 7 shows threading control dial 37 being rotated from neutral position toward forward position after detent plunger 221 has been released. During such movement, contact S1B closes and contact S1A opens and contact S2A remains closed and contact S2B remains open. Potentiometer 63 moves from neutral toward its forward signal position. As a result, forward solenoid 34A is energized to operate forward clutch 30 but reverse solenoid 35A remains de-energized. Torque converter clutch solenoid 33A remains energized.

As FIG. 8 shows, when dial 37 is in its maximum forward position, contact S2A opens to remove the hydraulic bias from solenoid 400A and contact S2B closes with no effect. The action of the interlock member 250, as FIG. 8 shows, is such that speed control dial 38 may now be rotated to any desired speed position between its minimum and maximum speeds.

FIG. 5 shows threading control dial 37 being rotated from neutral position toward reverse position after detent plunger 221 has been released. During such movement, contact S1B remains open and contact S1A remains closed but contact S2A opens and contact S2B closes. Potentiometer 63 moves from neutral to its reverse signal position. As a result, reverse solenoid 35A is energized to operate reverse clutch 31 but forward solenoid 34A remains de-energized. Transmission bias solenoid 400A remains energized. When dial 37 is in reverse position, the action of the interlock member 250 is such that speed control dial 38 may be rotated to any desired speed position between its minimum and maximum speeds.

When the threading control dial 37 is in the neutral position, the torque converter clutch 27 and clutches 30 and 31 are in the minimum engaged position. When dial 37 is moved to effect forward rotation of the drill holder 17, the potentiometer 63 is moved into the active area, thereby moving the governor control point proportionally above ground. When speed dial 38 is then actuated, a current signal proportional to its rotational movement is provided by potentiometer 64 to the torque converter clutch servo 33A and the forward clutch solenoid 34A remains energized through switch contact S1B. This increases apply pressure to torque converter clutch 27. Similarly, when dial 37 is moved from neutral position to reverse, the potentiometer 63 is moved into the active area to raise the governor control proportionally above ground. The speed dial 38 is then interlocked at minimum speed; current flow to solenoid 35A continues through switch contact S2B.

Control Functions of Drill Control Unit

FIGS. 9, 10, 11, and 12 schematically or graphically depict the control Functions which occur as the threading control dial 37 and the drill speed control dial 38 are moved to different operating positions. The control functions hereinafter described result from the general arrangement of the aforedescribed system components, the manner in which the several clutches are constructed and adjusted, the manner in which the electrical control system is arranged, and the manner in which the drill control unit 40 is designed and constructed. All of these factors work together to produce the following functional results.

Figure 9:
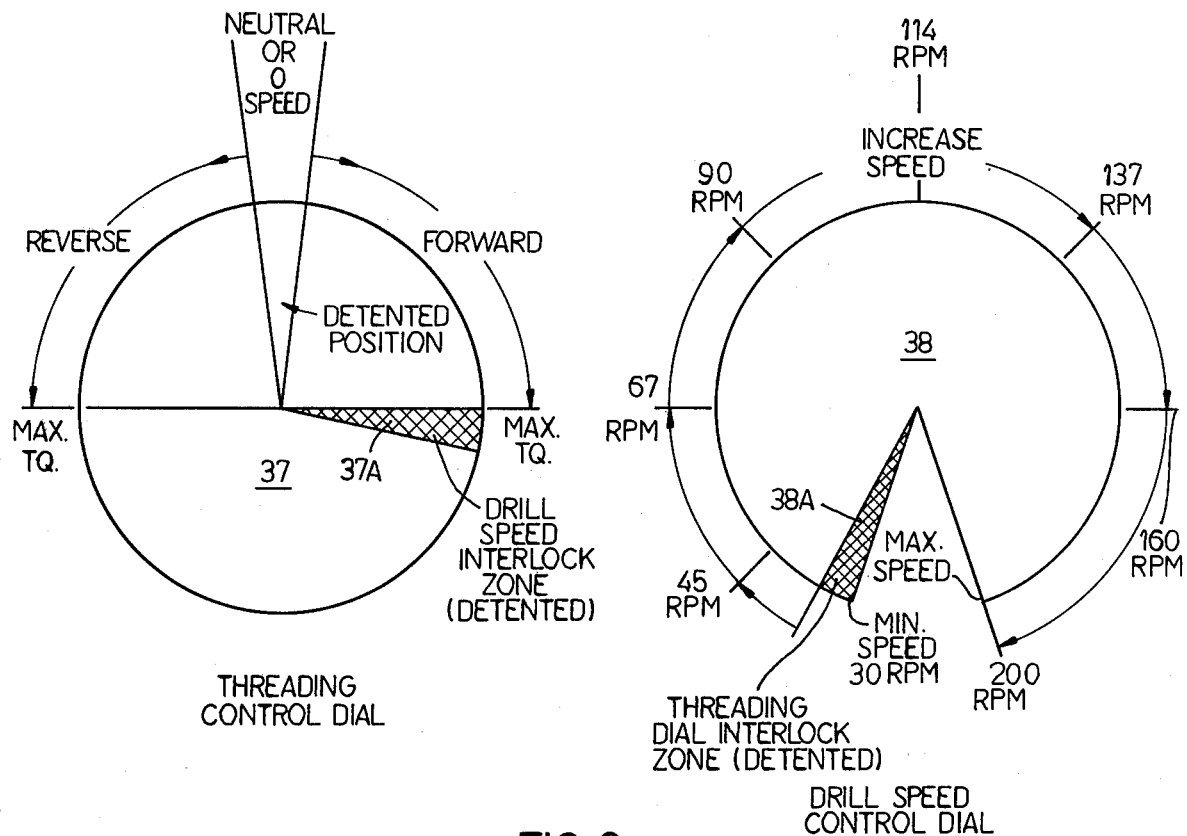
FIGS. 9, 10, 11, and 12 are schematic diagrams showing the functions of the dials of the drill control unit.

Referring to FIG. 9, it is seen that threading control dial 37 can be operated in forward or reverse directions from a neutral or zero speed position. A segment of dial 37 is shaded as at 37A to indicate the drill speed interlock zone. FIG. 9 also shows that drill speed control dial 38 can be rotated between a minimum speed of 30 rpm and a maximum speed of 200 rpm. A shaded region 38A depicts the threading dial interlock zone.

Figure 10:
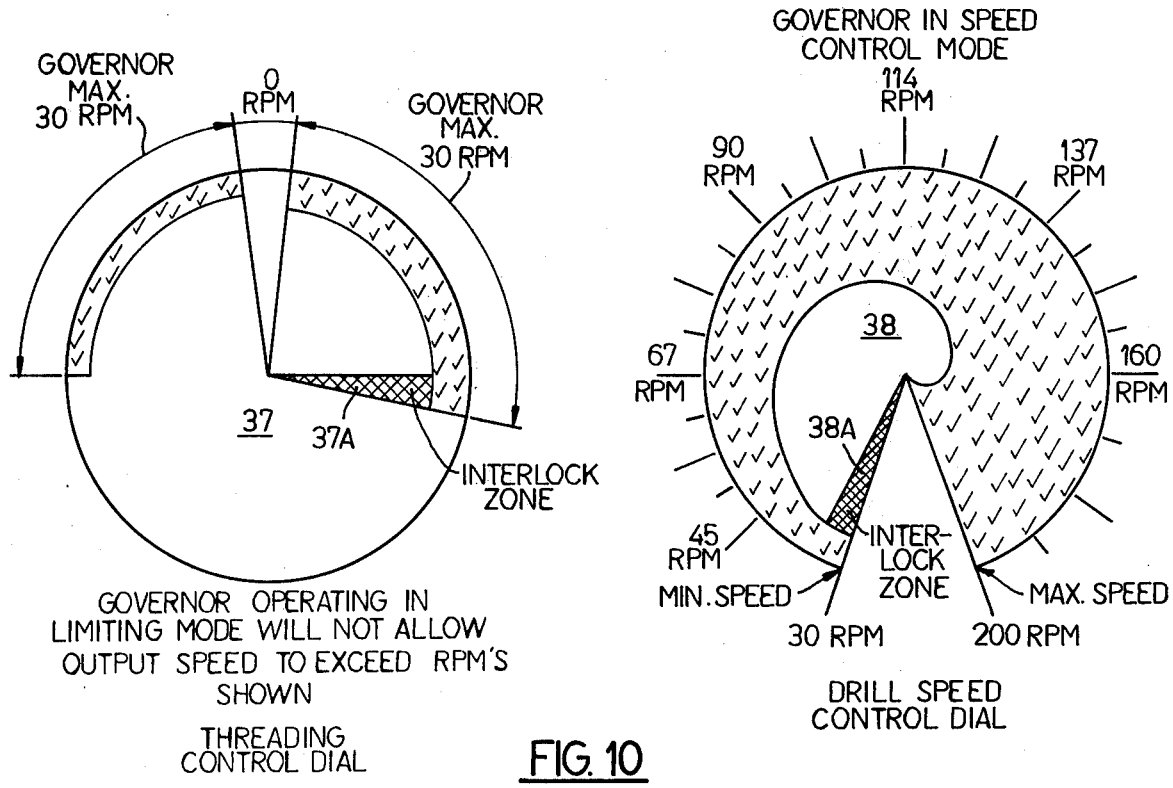

FIG. 10 shows that when threading control dial 37 is operating in the region between neutral and reverse, the governor controls the drill holder to limit its speed to 30 rpm, for example, and that when operating in the forward direction, the governor also limits maximum speed to 30 rpm. To put it another way, the governor 45 limits forward speed to 30 rpm until threading control dial 37 is rotated in the forward direction into the interlock zone 37A and until the drill speed control dial 38 is moved from its minimum speed position. FIG. 10 also shows that as drill speed control dial is rotated between its minimum speed and maximum speed positions, the governor operates to maintain the speed of drill holder 17 at the speed selected.

Figure 11:
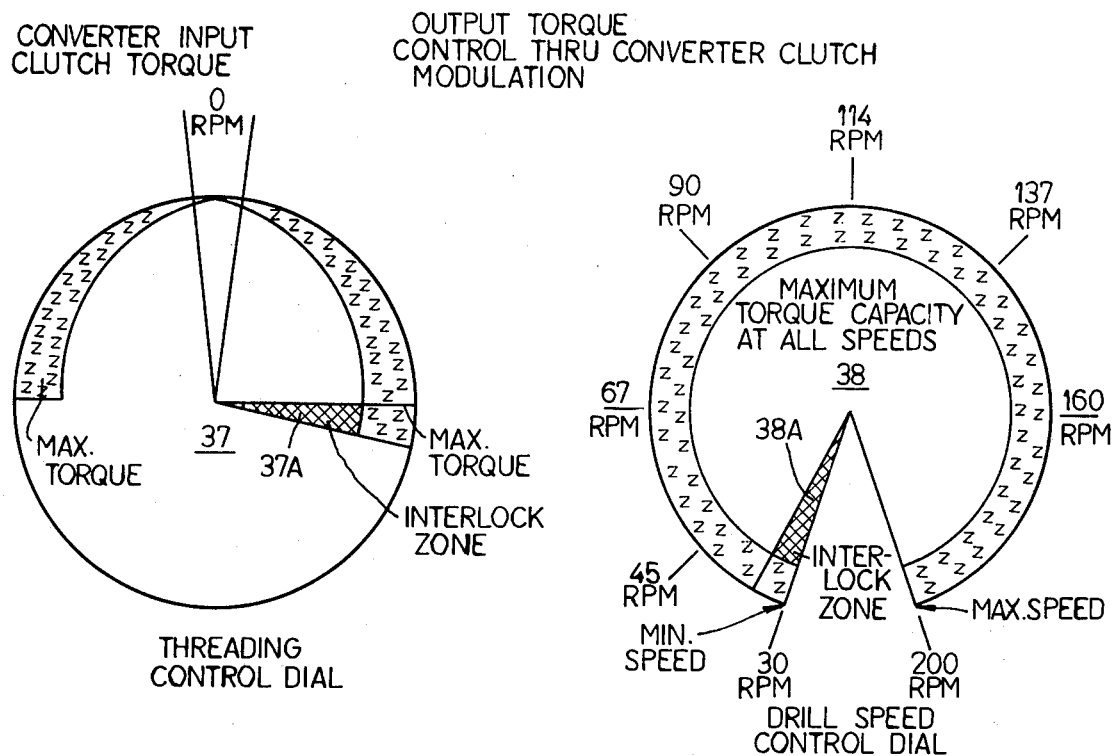

FIG. 11 depicts the concept that modulating valve 300 provides for zero to maximum torque as threading control dial 37 is moved between neutral and either forward or reverse positions. FIG. 11 also depicts that maximum torque is available at all speeds through which drill speed control dial 38 is operated.

Figure 12:
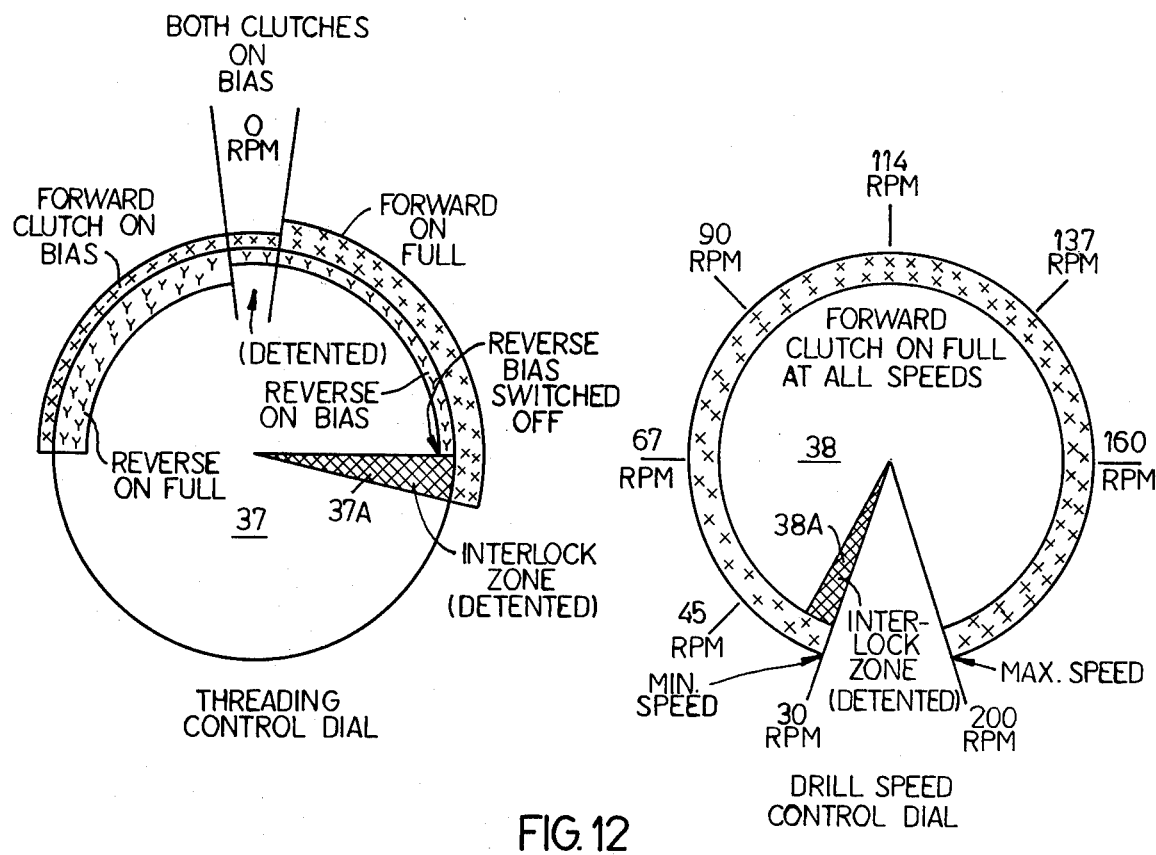

FIG. 12 depicts the behavior of the transmission clutches 30 and 31 during system operation. Thus, at zero rpm both clutches 30 and 31 are biased. As threading control dial 37 is moved from neutral to reverse, the forward clutch 30 remains biased and the reverse clutch 31 is fully engaged. Conversely, as threading control dial 37 is moved from neutral to forward, the reverse clutch 31 is biased and the forward clutch 30 is fully engaged. FIG. 12 also shows that the forward clutch 30 is fully engaged at all operational speeds between minimum and maximum speed, and that bias pressure on the reverse clutch is off when dial 37 is in its maximum forward position (dial 38 rotates between minimum and maximum speed).

As described hereinbefore, valves 34, 35, and 400 are controlled solely by the cam actuated switch logic of FIG. 4 (FIGS, 5, 6, 7, and 8). Valve 33 (and valve 33A) is controlled proportionally by the electrical output signal of governor 45. The general control sequence is as follows: A clutch 30 or 31 (and thereby a direction) is selected by cam actuated switching attendant to shaft 61 rotation. The input converter clutch 27 is then increased in engagement from its minimum position in proportion to the motion of dial 37. At some point, the increasing input power overcomes the drag torque and load on the output and causes output shaft rotation at a speed consistent with and defined by the position of potentiometer 64. This speed may be increased only by increasing the position of potentiometer 64, through rotation of dial 38; a condition applying only when the threading dial 37 is in its interlock position. Note that when dial 37 is in this interlock position (maximum clockwise), the bias pressure solenoid 400A is necessarily "off" and drag is thereby removed for the reverse clutch.

We claim:

1. A drilling rig including a drill holder rotatable in forward and reverse directions from neutral; a prime mover; a modulatable power transmission system connected between said prime mover and said drill holder, said modulatable power transmission system comprising directional clutch means for driving said drill holder in either forward or reverse directions and modulatable speed clutch means for driving said drill holder at desired rotational speeds; and a control system for operating said clutch means of said power transmission system to control the direction and speed of rotation of said drill holder, said control system including a drill control unit comprising a selectively operable directional control dial for controlling said directional clutch means and rotatable between neutral, forward and reverse positions, a selectively operable speed control dial for controlling said speed clutch means and rotatable to any position between minimum and maximum speed positions, said drill control unit further comprising interlock means connected between both of said control dials to permit movement of said directional control dial from one position to another position to operate said directional clutch means only when said speed control dial is in minimum speed position, and to permit movement of said speed control dial between minimum and maximum positions to modulate said speed clutch means only when said directional control element is in forward position.

2. A drilling rig according to claim 1 wherein said drill control unit includes releasable locking means for releasably locking said directional control dial in neutral position.

3. A drilling rig according to claim 1 wherein said drill control unit comprises: a support; a pair of spaced apart shafts mounted for selective rotation on said support; electrial components for said control system mounted on said support and operable in response to rotation of said shafts to control the direction and speed of rotation of said drill holder; a pair of interlock discs, each disc being mounted on and rotatable with one of said shafts, each disc being provided with a detent on its periphery; and an interlock member shiftably mounted on said support and extending between said discs, said member cooperating with said discs so that, when one end of said member engages the detent on one disc, the other end of said member engages the periphery of the other disc thereby preventing rotation of the shaft associated with said one disc while allowing rotation of the other shaft.

4. A control unit according to claim 3 including releasable locking means connected between said support and one of said shafts.

5. A control unit according to claim 4 including biasing means between said support and said interlock member to bias the latter toward one of said discs.

6. In a drilling rig: a drill holder rotatable in a desired direction at a desired speed; a prime mover; a power transmission system connected between said prime mover and said drill holder, said power transmission system comprising: a torque converter; a modulatable first torque converter clutch in said torque converter; a first solenoid operated clutch control valve for operating said torque converter clutch; a transmission connected to be driven by said torque converter; alternately operable second and third transmission clutches in said transmission; first and second solenoid operated clutch control valves for operating said second and third clutches, respectively; a selectively operable control system to control the direction and speed of rotation of said drill holder, said control system including means for operating said first valve for modulating said torque converter clutch and for operating a selected one of said second and third valves for engaging said transmission clutches to effect full engagement of said selected one of said transmission clutches prior to full engagement of said torque converter clutch; said control system further including a drill control unit comprising a selectively operable directional control member rotatable between neutral, forward, and reverse positions to effect operation of second or third valves, a selectively operable speed control member rotatable to any position between minimum and maximum speed positions to effect operation of said first valve, said drill control unit further comprising interlock means connected between both of said control members to permit movement of said directional control member only when said speed control member is in minimum speed position, and to permit movement of said speed control member only when said directional control member is in forward position.

7. A mobile drilling rig comprising: a rotatable drill holder, a torque converter and transmission connected between a prime mover on the rig and said drill holder, said torque converter including a proportional solenoid operated modulatable torque converter clutch for driving said drill holder at desired rotational speeds, said transmission including a pair of solenoid operated directional clutches selectively operable for driving the drill holder in either forward or reverse directions, and a control system, said control system including a manually operable electromechanical drill control unit having separate control members for direction and speed control, said control unit including interlock means for said control members to permit operator manipulation of the direction and speed control members only in a predetermined sequence to thereby prevent damage to said rig, said control system including means to operate the clutches so as to enable drill holder rotation in either forward or reverse direction from neutral, to enable forward drill holder rotation at any selected speed within a predetermined speed range, to effect reverse drill holder rotation at a predetermined minimum speed, to maintain the selected or predetermined drill speed constant by automatically matching torque to load, and to automatically modulate said clutches so that the selected one of said directional clutch engages before and disengages after said torque converter clutch to thereby smooth out starting and stopping of drill holder rotation.

8. A mobile drilling rig comprising: a rotatable drill holder, a torque converter and transmission connected between a prime mover on the rig and said drill holder, said torque converter including modulatable torque converter clutch means for driving said drill holder at desired rotational speeds, said transmission including directional clutch means selectively operable for driving the drill holder in either forward or reverse directions, and a control system, said control system including a manually operable electromechanical drill control unit having separate control members for direction and speed control, said control unit including interlock means for said control members to permit operator manipulation of the direction and speed control members only in a predetermined sequence to thereby prevent damage to said rig, said control system including means to operate said clutch means so as to enable drill holder rotation in either forward or reverse direction from neutral, to enable forward drill holder rotation at any selected speed within a predetermined speed range, and to effect reverse drill holder rotation at a predetermined minimum speed.

9. A mobile drilling rig according to claim 8 wherein said control system further includes means to maintain the selected or predetermined drill speed constant by automatically matching torque to load.

10. A mobile drilling rig according to claim 8 wherein said control system further includes means to automatically modulate said clutch means so that said directional clutch means engages before and disengages after said torque converter clutch means to thereby smooth out starting and stopping of drill holder rotation.

11. In a drilling rig: a drill holder rotatable in a desired direction at a desired speed; a prime mover; a power transmission system connected between said prime mover and said drill holder, said power transmission system comprising: a torque converter; a modulatable first torque converter clutch in said torque converter; a first clutch control valve for operating said torque converter clutch; a transmission connected to be driven by said torque converter; alternately operable second and third transmission clutches in said transmission; first and second clutch control valves for operating said second and third clutches, respectively; a selectively operable control system to control the direction and speed of rotation of said drill holder, said control system including means for operating said first valve for modulating said torque converter clutch and for operating a selected one of said second and third valves for engaging said transmission clutches to effect full engagement of said selected one of said transmission clutches prior to full engagement of said torque converter clutch; said control system further including a drill control unit comprising a selectively operable directional control member rotatable between neutral, forward, and reverse positions to effect operation of second or third valves, a selectively operable speed control member rotatable to any position between minimum and maximum speed positions to effect operation of said first valve, said drill control unit further comprising interlock means connected between both of said control members to permit movement of said directional control member only when said speed control member is in minimum speed position, and to permit movement of said speed control member only when said directional control member is in forward position.

* * * * *